Figure 1:
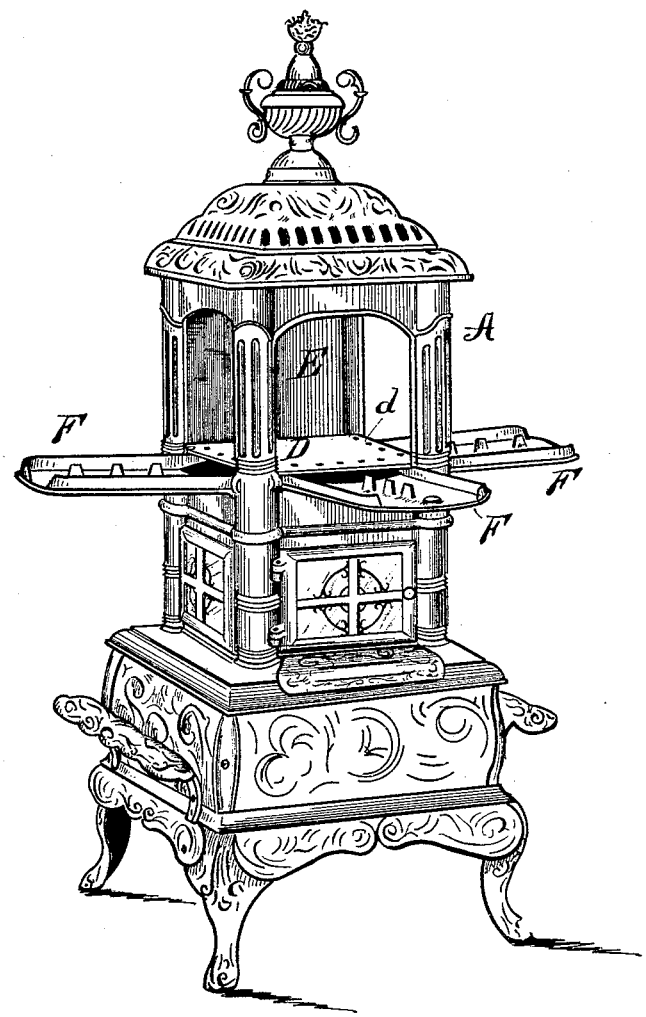

(No Model.) 2 Sheets—Sheet 1.

A. F. ZIMMERLING.
OIL STOVE.

No. 476,352. Patented June 7, 1892.

WITNESSES
D. W. Bradford
F. Clough

INVENTOR
August F. Zimmerling
by Parker & Burton
his Attorneys.

(No Model.)
2 Sheets—Sheet 2.
A. F. ZIMMERLING.
OIL STOVE.
No. 476,352.                Patented June 7, 1892.
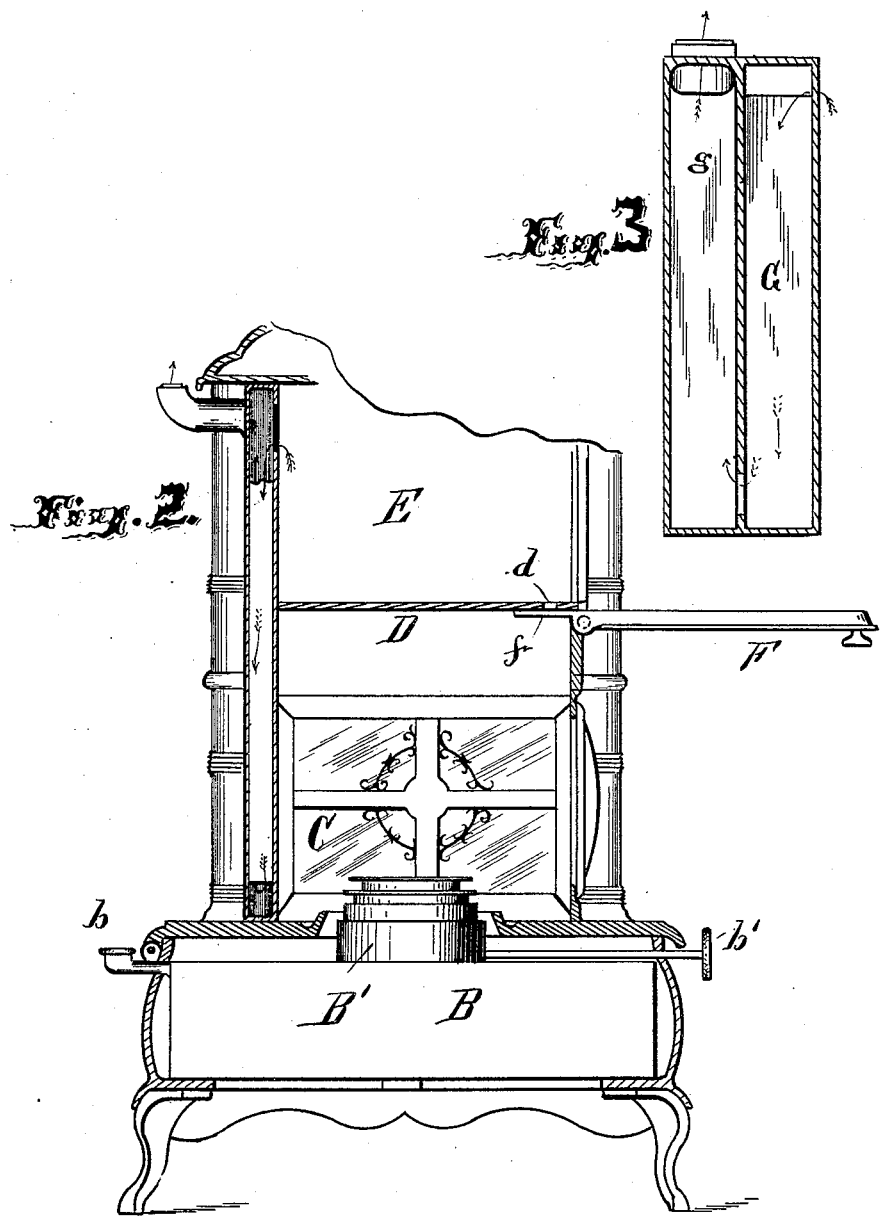
WITNESSES
D. W. Bradford
F. Clough
INVENTOR
August F. Zimmerling
by Parker & Burton
his Attorneys.

UNITED STATES PATENT OFFICE.

AUGUST F. ZIMMERLING, OF JACKSON, MICHIGAN.

OIL-STOVE.

SPECIFICATION forming part of Letters Patent No. 476,352, dated June 7, 1892.

Application filed August 31, 1891. Serial No. 404,361. (No model.)

*To all whom it may concern:*

Be it known that I, AUGUST F. ZIMMERLING, a citizen of the United States, residing at Jackson, county of Jackson, State of Michigan, have invented a certain new and useful Improvement in Oil-Stoves; and I declare the following to be a full, clear, and exact description of the same, such as will enable others skilled in the art to which it pertains to make and use the same, reference being had to the accompanying drawings, which form a part of this specification.

My invention relates to stoves, and has for its object the production of a stove using hydrocarbon-burners, either gas or oil, and is particularly designed to provide means whereby the stove may be adapted for heating purposes, for baking, cooking, or heating, where a closed heated compartment is desired, and for heating several articles or cooking utensils at the same time with one burner. I accomplish this by the use of a stove of a vertical box-like form, having the burner located at the base, preferably in a closed chamber, and having a second heating-chamber above this burner-chamber and separated from it by a plate or partition, the upper heating-chamber being also closed by doors on the side of the stove, so as to adapt it to be used as a baking or heating oven, and in which the doors may be opened, preferably downward, and when fully open form a horizontal flue, as well as a support for cooking utensils or other articles to be heated.

I propose to provide the stove for heating purposes by closing the burner-chamber and the upper heating-chamber and combining with them a diving-flue, forming an outlet for the heat from the upper chamber to any suitable exit-pipe.

In the drawings, Figure 1 is a perspective of my stove. Fig. 2 is a vertical section. Fig. 3 is a vertical section of the flue.

In the drawings, A is the frame-work of the stove, which is preferably square in horizontal cross-section and may be made of any design to suit the manufacturer.

B is the oil-tank, located in the base of the frame, in which is set the burner B'. The oil-tank has an inlet-pipe $b$ and the usual feeding thumb-screw $b'$ in the front of the stove.

C is a chamber inclosing the burner proper, and forms the first heating-chamber. Above this chamber is the partition D, provided with openings $d$, preferably around the outer edge. Above this partition is the heating oven or chamber E.

F are doors closing this heating-oven and opening outward and preferably downward, as shown in Fig. 1. These doors are pivoted to the frame and have a portion $f$ extending below the pivot, and when the doors are open and lowered, as shown in Fig. 1, this extension swings up under the partition D and closes off the openings $d$. The doors are concave on the inside, so as to provide a flue underneath the portion $f$ when the door is lowered. The inside of the door in the concave portion is provided with lugs or ribs of any suitable form to support cooking utensils or articles to be heated. When the doors are closed, the heat generated in the chamber C passes up through the opening $d$ in the partition D and heats the upper chamber E and passes through the diving-flue G and out through the outlet $g$. When used in this manner, the stove becomes a heater by reason of the use of the two inclosed heating-chambers and the diving-flue. When the doors are opened or lowered, the heat from the chamber C is deflected by the partition D and caused to pass out under the portion $f$ of the door and over the concave portion and under any article that may be placed on the door, thus converting the door itself into a horizontal flue for heating cooking utensils or other articles, and thus providing for heating three separate articles on as many sides of the stove, and, if desired, a fourth article inside of the stove on the partition D.

The chamber E may be used for a baking-oven or for heating sad-irons or other articles, as the heat will pass up through the opening $d$ on three sides of the partition when one door is opened. The partition D is always heated directly by the lamp underneath it. It is my purpose to have this partition act as a deflector for the heat; but it may be provided with openings in the center, if desired, though I prefer the form shown.

I am not aware that a stove of any kind has ever been constructed in which the doors closing the frame or any portion of it have been adapted when lowered to form a flue for conducting the heat or for receiving and heating cooking utensils or other articles in the manner shown and described herein. The lower chamber C may be provided with transparent doors, if desired.

What I claim is—

1. In combination with a stove, a door adapted when opened to form a flue, substantially as described.

2. In combination with a stove, a door adapted when open to receive articles to be heated and to form a flue for conducting heat to said articles, substantially as described.

3. A stove for burning hydrocarbons, consisting of a vertical frame provided at its base with a burner, a deflecting-partition over said burner, and doors closing the compartments above said deflecting-partition, adapted when open to form horizontal flues, substantially as described.

4. A stove for burning hydrocarbons, consisting of a vertical frame provided at its base with a burner, a deflecting-partition over said burner, and doors closing a compartment above said deflecting-partition, adapted when open to receive articles to be heated and to form a flue for conducting the heat to said articles, substantially as described.

5. A stove for burning hydrocarbons, consisting of a vertical frame provided with a burner at its base, a heating-compartment above said burner, a partition between the burner-chamber and said heating-chamber, provided with openings to admit the heat to said heating-chamber, and doors closing said heating-chamber, adapted when open to close the said openings in the partition and form horizontal flues, substantially as described.

6. A stove for burning hydrocarbons, consisting of a vertical frame provided at its base with a burner, a heating-compartment above said burner, a partition between said burner and the heating-compartment, provided with openings to admit the heat, a diving outlet-flue leading from said chamber, and doors closing said chamber, adapted when opened to close the openings in the partition and to form horizontal flues, substantially as described.

In testimony whereof I sign this specification in the presence of two witnesses.

AUGUST F. ZIMMERLING.

Witnesses:
  GEO. MEISTER,
  L. J. HARRIS.